United States Patent
Li et al.

(10) Patent No.: US 11,871,403 B2
(45) Date of Patent: Jan. 9, 2024

(54) RESOURCE USE STATUS REPORTING METHOD AND COMMUNICATIONS APPARATUS

(71) Applicant: Huawei Technologies Co., Ltd., Shenzhen (CN)

(72) Inventors: Mingchao Li, Beijing (CN); Hang Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 428 days.

(21) Appl. No.: 17/164,493

(22) Filed: Feb. 1, 2021

(65) Prior Publication Data

US 2021/0160899 A1    May 27, 2021

Related U.S. Application Data (63) Continuation of application No. PCT/CN2018/098677, filed on Aug. 3, 2018.

(51) Int. Cl.
| | |
|---|---|
| *H04W 72/12* | (2023.01) |
| *H04W 72/1263* | (2023.01) |
| *H04L 1/1607* | (2023.01) |
| *H04W 24/10* | (2009.01) |
| *H04W 72/02* | (2009.01) |
| *H04W 72/0446* | (2023.01) |

(52) U.S. Cl.
CPC ....... *H04W 72/1263* (2013.01); *H04L 1/1614* (2013.01); *H04W 24/10* (2013.01); *H04W 72/02* (2013.01); *H04W 72/0446* (2013.01)

(58) Field of Classification Search
CPC .... H04L 1/1614; H04W 24/10; H04W 72/02; H04W 72/0446; H04W 72/1263; H04W 72/23

USPC ......................................................... 370/329
See application file for complete search history.

(56) References Cited

U.S. PATENT DOCUMENTS

| | | | |
|---|---|---|---|
| 2016/0330728 A1* | 11/2016 | Sorrentino | H04W 72/51 |
| 2018/0249470 A1* | 8/2018 | Seo | H04W 72/53 |
| 2019/0174463 A1* | 6/2019 | Zeng | H04W 72/56 |

(Continued)

FOREIGN PATENT DOCUMENTS

| | | |
|---|---|---|
| CN | 105265002 A | 1/2016 |
| CN | 106793096 A | 5/2017 |

(Continued)

OTHER PUBLICATIONS

Intel Corporation, "On Sidelink Resource Pool Sharing for eNB-Controlled and UE-Autonomous V2V Transmission Modes", 3GPP TSG RAN WG1 Meeting #93, R1-1806484, Busan, Korea, May 21-25, 2018, 4 pages.

(Continued)

*Primary Examiner* — Robert J Lopata
(74) *Attorney, Agent, or Firm* — Slater Matsil, LLP (57) ABSTRACT

Embodiments of this application provide a resource use status reporting method and a communications apparatus. A terminal device divides a resource in a first resource set into a plurality of to-be-measured resources based on a first measurement parameter used to indicate a length of the to-be-measured resource, determines a use status of each to-be-measured resource to obtain use status information, and then reports the use status information to a network device.

20 Claims, 4 Drawing Sheets

(56) References Cited

U.S. PATENT DOCUMENTS

| | | | |
|---|---|---|---|
| 2020/0229150 A1* | 7/2020 | Li | H04W 76/14 |
| 2020/0288432 A1* | 9/2020 | Min | H04W 24/10 |
| 2023/0007629 A1* | 1/2023 | Min | H04W 4/40 |
| 2023/0011663 A1* | 1/2023 | Hong | H04W 72/20 |

FOREIGN PATENT DOCUMENTS

| | | |
|---|---|---|
| EP | 3550905 A1 | 10/2019 |
| TW | 201824814 A | 7/2018 |
| WO | 2018084034 A1 | 5/2018 |

OTHER PUBLICATIONS

Huawei et al., "Mode-3 sensing and reporting for resource pool sharing", 3GPP TSG-RAN WG2 Meeting #102, R2-1808314, Busan, Korea, May 21-25, 2018, 4 pages.

Intel Corporation, "On Mode 3 sensing and reporting for resource pool sharing", 3GPP TSG-RAN WG2 Meeting 102, R2-1807511, Busan, Korea, May 21-25, 2018, 3 pages.

3GPP TS 36.213 V15.2.0 (Jun. 2018); 3rd Generation Partnership Project; Technical Specification Group Radio Access Network; Evolved Universal Terrestrial Radio Access (E-UTRA); Physical layer procedures (Release 15), 541 pages.

3GPP TS 36.331 V15.2.2 (Jun. 2018); 3rd Generation Partnership Project; Technical Specification Group Radio Access Network; Evolved Universal Terrestrial Radio Access (E-UTRA); Radio Resource Control (RRC); Protocol specification Release 15), 791 pages.

3GPP TS 37.340 V15.2.0 (Jun. 2018), 3rd Generation Partnership Project; Technical Specification Group Radio Access Network; Evolved Universal Terrestrial Radio Access (E-UTRA) and NR; Multi-connectivity; Stage 2 (Release 15), 55 pages.

\* cited by examiner

RESOURCE USE STATUS REPORTING METHOD AND COMMUNICATIONS APPARATUS

CROSS-REFERENCE TO RELATED APPLICATIONS

This application is a continuation of International Application No. PCT/CN208/098677, filed on Aug. 3, 2018, the disclosure of which is hereby incorporated by reference in its entirety.

TECHNICAL FIELD

This application relates to the field of communications technologies, and in particular, to a resource use status reporting method and a communications apparatus.

BACKGROUND

Currently, vehicle communication in an intelligent transportation system (ITS) includes vehicle-to-vehicle (V2V) communication, vehicle-to-infrastructure (V2I) communication, vehicle-to-pedestrian (V2P) communication, vehicle-to-network (V2N) communication, and the like. The foregoing various types of communication are collectively referred to as V2X (where X represents anything) communication.

In V2X communication, a direct link is established between two objects that communicate with each other, for example, vehicles, a vehicle and an infrastructure, or a vehicle and user equipment. After the direct link is established, in the two objects that communicate with each other, a transmit end directly sends data to a receive end, and the data does not need to be forwarded by a network device such as a base station. Compared with forwarding data by the network device, which occupies resources twice, sending data through the direct link occupies resources only once. Therefore, sending data through the direct link can reduce resource occupation. There are two transmission modes in direct link-based communication: a centralized scheduling transmission mode and a distributed transmission mode. In the centralized scheduling transmission mode, each time before sending V2X data, a transmit end needs to apply to the network device for a resource, and then send the V2X data on the applied resource. In this process, each time data is sent, the transmit end needs to interact with the network device. Consequently, a V2X data transmission delay is relatively long. In the distributed transmission mode, the network device pre-configures a distributed resource pool. Each time V2X data is sent, a transmit end device obtains a resource from the distributed resource pool, and sends V2X data on the resource. In this process, different transmit ends may select a same resource. Consequently, a transmission collision may occur. To achieve a compromise between the two transmission modes, in the two transmission modes, the network device separately configures a resource pool, that is, a distributed resource pool and a centralized scheduling resource pool. Some or all resources in the two resource pools overlap. To enable the base station to perceive a use status of a resource in the centralized scheduling resource pool, a terminal device for which the centralized scheduling transmission mode is configured needs to send an uplink message to the network device, where the uplink message indicates the use status of the resource, to report an occupation status of the resource in the centralized scheduling resource pool to the network device. In this way, the network device can allocate, based on the uplink information, an unused resource to the terminal device for which the centralized scheduling transmission mode is configured, thereby improving reliability of V2X data transmission.

However, when there is a relatively large quantity of resources in the centralized scheduling resource pool, an amount of data corresponding to use statuses of the resources is very large. Consequently, an uplink message sent by the terminal device is very large, and severe reporting overheads are caused.

SUMMARY

Embodiments of this application provide a resource use status reporting method and a communications apparatus, where use statuses of resources in a centralized scheduling resource pool are reported to a network device, so that the network device allocates, based on the use statuses of the resources, an unoccupied resource to a terminal device that is in a centralized scheduling transmission mode, to improve transmission reliability.

According to a first aspect, an embodiment of this application provides a resource use status reporting method. The method may be applied to a terminal device, or may be applied to a chip in a terminal device. The following describes the method by using an example in which the method is applied to a terminal device. The method includes the following.

The terminal device obtains configuration information of a first resource set. The first resource set includes a resource in a centralized scheduling resource pool. The configuration information is used to indicate a location of a resource in the first resource set.

The terminal device obtains a first measurement parameter. The first measurement parameter indicates a length of a to-be-measured resource.

The terminal device divides the resource in the first resource set into at least one to-be-measured resource based on the first measurement parameter.

The terminal device determines a use status of each to-be-measured resource in the at least one to-be-measured resource to obtain use status information.

The terminal device sends the use status information to a network device.

According to the method provided in the first aspect, the terminal device divides the resource in the first resource set into a plurality of to-be-measured resources based on the first measurement parameter used to indicate the length of the to-be-measured resource, determines the use status of each to-be-measured resource to obtain the use status information, and then reports the use status information to the network device, so that the network device can perceive a use status of the resource in the centralized scheduling resource pool, thereby avoiding a collision between a resource allocated to a terminal device that is in a centralized scheduling mode and a resource that has been selected by a terminal device that is in a distributed transmission mode, and improving transmission reliability.

In a feasible implementation, that the terminal device determines a use status of each to-be-measured resource in the at least one to-be-measured resource to obtain use status information includes:

The terminal device obtains a first level parameter. The first level parameter indicates a priority of to-be-sent data of the terminal device.

The terminal device obtains a second level parameter. The second level parameter indicates a priority carried in data received by the terminal device on a first to-be-measured resource. The first to-be-measured resource is any one of the at least one to-be-measured resource.

The terminal device determines a measurement threshold based on the first level parameter and the second level parameter.

The terminal device determines signal quality detected on the first to-be-measured resource.

The terminal device determines a use status of the first to-be-measured resource based on the signal quality and the measurement threshold to obtain use status information of the first to-be-measured resource.

According to the method provided in the possible implementation, the terminal device determines the use status of the first to-be-measured resource by using the first level parameter, the second level parameter, the measurement threshold, and the signal quality on the first to-be-measured resource.

In a possible implementation, that the terminal device obtains a first level parameter includes the following.

The terminal device receives the first level parameter sent by the network device.

Alternatively, the terminal device determines the first level parameter from at least one level parameter. Each level parameter in the at least one level parameter corresponds to one piece of carried data. Each piece of carried data corresponds to a logical channel of one direct link of the terminal device. The first level parameter is any one of the at least one level parameter, or the first level parameter is a highest level parameter in the at least one level parameter.

Alternatively, the terminal device determines the first level parameter based on a level parameter set. The level parameter set includes at least one level parameter.

According to the method provided in the possible implementation, the terminal device obtains the first level parameter.

In a feasible implementation, the use status information specifically includes a first bitmap. Bit fields in the first bitmap correspond to different to-be-measured resources. A value of each bit field in the first bitmap indicates a use status of a to-be-measured resource corresponding to the bit field. A location of each bit field in the first bitmap indicates a location of a to-be-measured resource corresponding to the bit field.

According to the method provided in the possible implementation, the terminal device reports use statuses of to-be-measured resources of a plurality of subframes to the network device by using one bitmap. In this process, the bitmap can include use status information of a relatively large quantity of to-be-measured resources, and bitmap overheads are relatively small, so that reporting overheads are reduced while the terminal device reports as much use status information as possible.

In a feasible implementation, the use status information specifically includes at least one second bitmap. Each second bitmap corresponds to one subframe. Bit fields in the second bitmap correspond to different to-be-measured resources in the subframe corresponding to the second bitmap. A value of each bit field in the second bitmap indicates a use status of a to-be-measured resource corresponding to the bit field. A location of each bit field in the second bitmap indicates a location of a to-be-measured resource corresponding to the bit field.

According to the method provided in the possible implementation, the terminal device reports use statuses of to-be-measured resources of a plurality of subframes to the network device by using one bitmap. In this process, the bitmap can include use status information of a relatively large quantity of to-be-measured resources, and bitmap overheads are relatively small, so that reporting overheads are reduced while the terminal device reports as much use status information as possible.

In a feasible implementation, the use status information further includes time domain information. The time domain information is used to indicate a location of the subframe corresponding to the second bitmap. The time domain information includes:

at least one piece of first indication information, where each piece of first indication information corresponds to one second bitmap, and the first indication information indicates the subframe location of the subframe corresponding to the second bitmap; or second indication information and at least one piece of offset information, where the second indication information indicates a reference subframe location of a reference subframe, each piece of offset information corresponds to one second bitmap, and the offset information indicates a location of the subframe corresponding to the second bitmap relative to the reference subframe; or a third bitmap, where each bit field in the third bitmap corresponds to one subframe, a value of each bit field in the third bitmap indicates whether a subframe corresponding to the bit field corresponds to one second bitmap, and a location of each bit field in the third bitmap indicates a time domain location of a subframe corresponding to the bit field.

According to the method provided in the possible implementation, the subframe corresponding to the second bitmap is indicated.

In a feasible implementation, that the terminal device obtains a first measurement parameter includes the following.

The terminal device receives the first measurement parameter sent by the network device.

Alternatively, the terminal device receives at least one second measurement parameter sent by the network device, and determines the first measurement parameter from the at least one second measurement parameter.

Alternatively, the terminal device determines the first measurement parameter based on a third measurement parameter and a fourth measurement parameter. The first measurement parameter is greater than or equal to the third measurement parameter. The first measurement parameter is less than or equal to the fourth measurement parameter. The third measurement parameter and the fourth measurement parameter are predefined, or are configured through higher layer signaling.

According to the method provided in the possible implementation, the terminal device obtains the first measurement parameter.

In a feasible implementation, the method further includes the following.

The terminal device sends the first measurement parameter to the network device.

According to the method provided in the possible implementation, the terminal device reports the first measurement parameter to the network device.

In a feasible implementation, the first resource set is a subset of a second resource set. The second resource set includes the resource in the centralized scheduling resource pool. That the terminal device determines a use status of each to-be-measured resource in the at least one to-be-measured resource to obtain use status information includes:

The terminal device divides a resource in the second resource set into at least one to-be-measured resource based on the first measurement parameter.

The terminal device determines a use status of each to-be-measured resource in the at least one to-be-measured resource corresponding to the second resource set to obtain use status information of each resource in the second resource set.

The terminal device determines use status information of each resource in the first resource set from the use status information of each resource in the second resource set based on the configuration information.

According to the method provided in the possible implementations, the terminal device first measures each to-be-measured resource in the second resource set to obtain the use status information of each to-be-measured resource in the second resource set, and then determines the use status information of each to-be-measured resource in the first resource set from the use status information of each to-be-measured resource in the second resource set based on the configuration information of the first resource set, to avoid a great change in a current protocol, so that the network device can perceive a use status of the resource in the centralized scheduling resource pool, thereby avoiding a collision between a resource allocated to a terminal device that is in a centralized scheduling mode and a resource that has been selected by a terminal device that is in a distributed transmission mode, and improving transmission reliability.

According to a second aspect, an embodiment of this application provides a resource use status reporting method. The method may be applied to a network device, or may be applied to a chip in a network device. The following describes the method by using an example in which the method is applied to a network device. The method includes:

The network device receives use status information sent by a terminal device. The use status information is used to indicate a use status of each to-be-measured resource in at least one to-be-measured resource in a first resource set. The first resource set includes a resource in a centralized scheduling resource pool. The use status is determined by the network device based on a first measurement parameter. The first measurement parameter indicates a length of the to-be-measured resource.

The network device allocates the resource in the scheduling resource pool based on the use status information.

According to the method provided in the second aspect, the terminal device divides the resource in the first resource set into a plurality of to-be-measured resources based on the first measurement parameter used to indicate the length of the to-be-measured resource, determines the use status of each to-be-measured resource to obtain the use status information, and then reports the use status information to the network device, so that the network device can perceive a use status of the resource in the centralized scheduling resource pool, thereby avoiding a collision between a resource allocated to a terminal device that is in a centralized scheduling mode and a resource that has been selected by a terminal device that is in a distributed transmission mode, and improving transmission reliability.

In a feasible implementation, before the network device receives the use status information sent by the terminal device, the method further includes:

The network device sends a first level parameter to the terminal device. The first level parameter indicates a priority of to-be-sent data of the terminal device.

According to the method provided in the possible implementation, the network device sends the first level parameter to the terminal device.

In a feasible implementation, the use status information specifically includes a first bitmap. Bit fields in the first bitmap correspond to different to-be-measured resources. A value of each bit field in the first bitmap indicates a use status of a to-be-measured resource corresponding to the bit field. A location of each bit field in the first bitmap indicates a location of a to-be-measured resource corresponding to the bit field.

According to the method provided in the possible implementation, the terminal device reports use statuses of to-be-measured resources of a plurality of subframes to the network device by using one bitmap. In this process, the bitmap can include use status information of a relatively large quantity of to-be-measured resources, and bitmap overheads are relatively small, so that reporting overheads are reduced while the terminal device reports as much use status information as possible, thereby reducing reporting overheads.

In a feasible implementation, the use status information specifically includes at least one second bitmap. Each second bitmap corresponds to one subframe. Bit fields in the second bitmap correspond to different to-be-measured resources in the subframe corresponding to the second bitmap. A value of each bit field in the second bitmap indicates a use status of a to-be-measured resource corresponding to the bit field. A location of each bit field in the second bitmap indicates a location of a to-be-measured resource corresponding to the bit field.

According to the method provided in the possible implementation, the terminal device reports use statuses of to-be-measured resources of a plurality of subframes to the network device by using one bitmap. In this process, the bitmap can include use status information of a relatively large quantity of to-be-measured resources, and bitmap overheads are relatively small, so that reporting overheads are reduced while the terminal device reports as much use status information as possible.

In a feasible implementation, the use status information further includes time domain information. The time domain information is used to indicate a location of the subframe corresponding to the second bitmap. The time domain information includes the following:

at least one piece of first indication information, where each piece of first indication information corresponds to one second bitmap, and the first indication information indicates the subframe location of the subframe corresponding to the second bitmap; or second indication information and at least one piece of offset information, where the second indication information indicates a reference subframe location of a reference subframe, each piece of offset information corresponds to one second bitmap, and the offset information indicates a location of the subframe corresponding to the second bitmap relative to the reference subframe; or a third bitmap, where each bit field in the third bitmap corresponds to one subframe, a value of each bit field in the third bitmap indicates whether a subframe corresponding to the bit field corresponds to one second bitmap, and a location of each bit field in the third bitmap indicates a time domain location of a subframe corresponding to the bit field.

According to the method provided in the possible implementation, the subframe corresponding to the second bitmap is indicated.

In a feasible implementation, before that the network device receives use status information sent by a terminal device, the method further includes the following.

The network device sends the first measurement parameter to the terminal device.

According to the method provided in the possible implementation, the network device sends the first measurement parameter to the terminal device.

In a feasible implementation, the method further includes the following.

The network device receives the first measurement parameter sent by the terminal device.

According to the method provided in the possible implementation, the network device sends the first measurement parameter to the terminal device.

According to a third aspect, an embodiment of this application provides a communications apparatus. The communications apparatus may be a terminal device, or may be a chip in a terminal device. The communications apparatus may include a processing unit and a transceiver unit. When the apparatus is a terminal device, the processing unit may be a processor, and the transceiver unit may be a transceiver. The terminal device may further include a storage unit. The storage unit may be a memory. The storage unit is configured to store an instruction, and the processing unit executes the instruction stored in the storage unit, so that the terminal device performs the communication method provided in the first aspect or the possible implementations of the first aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs the resource use status reporting method provided in the first aspect or the possible implementations of the first aspect. The storage unit may be a storage unit (for example, a register or a buffer) in the chip, or may be a storage unit (for example, a read-only memory or a random access memory) located outside the chip in the terminal device.

According to a fourth aspect, an embodiment of this application provides a communications apparatus. The communications apparatus may be a network device, or may be a chip in a network device. The communications apparatus may include a processing unit and a transceiver unit. When the apparatus is a network device, the processing unit may be a processor, and the transceiver unit may be a transceiver. The network device may further include a storage unit. The storage unit may be a memory. The storage unit is configured to store an instruction, and the processing unit executes the instruction stored in the storage unit, so that the network device performs the communication method provided in the second aspect or the possible implementations of the second aspect. When the apparatus is a chip in a network device, the processing unit may be a processor, and the transceiver unit may be an input/output interface, a pin, a circuit, or the like. The processing unit executes an instruction stored in a storage unit, so that the network device performs the resource use status reporting method provided in the second aspect or the possible implementations of the second aspect. The storage unit may be a storage unit (for example, a register or a buffer) in the chip, or may be a storage unit (for example, a read-only memory or a random access memory) located outside the chip in the network device.

According to a fifth aspect, an embodiment of this application provides a computer program product including an instruction. When the computer program product runs on a computer, the computer is enabled to perform the method in the first aspect or the possible implementations of the first aspect.

According to a sixth aspect, an embodiment of this application provides a computer program product including an instruction. When the computer program product runs on a computer, the computer is enabled to perform the method in the second aspect or the possible implementations of the second aspect.

According to a seventh aspect, an embodiment of this application provides a computer-readable storage medium. The computer-readable storage medium stores an instruction. When the instruction is run on a computer, the computer is enabled to perform the method in the first aspect or the possible implementations of the first aspect.

According to an eighth aspect, an embodiment of this application provides a computer-readable storage medium. The computer-readable storage medium stores an instruction. When the instruction is run on a computer, the computer is enabled to perform the method in the second aspect or the possible implementations of the second aspect.

According to the resource use status reporting method and the communications apparatus provided in the embodiments of this application, the terminal device divides the resource in the first resource set into a plurality of to-be-measured resources based on the first measurement parameter used to indicate the length of the to-be-measured resource, determines the use status of each to-be-measured resource to obtain the use status information, and then reports the use status information to the network device, so that the network device can perceive the use status of the resource in the centralized scheduling resource pool, thereby avoiding a collision between a resource allocated to a terminal device that is in a centralized scheduling mode and a resource that has been selected by a terminal device that is in a distributed transmission mode, and improving transmission reliability.

DETAILED DESCRIPTION OF ILLUSTRATIVE EMBODIMENTS

Figure 1A:
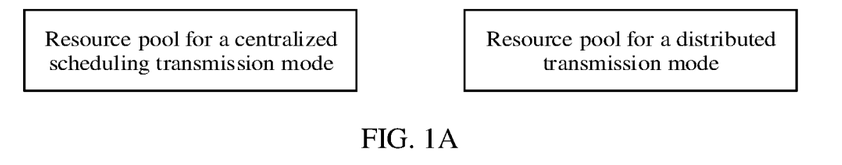
FIG. 1A is a schematic diagram of a resource pool for a centralized scheduling transmission mode and a resource pool for a distributed transmission mode in the current technology.

In Release 14 of the 3rd generation partnership project (3GPP), two transmission modes are defined for V2X communication that is based on a direct link: a centralized scheduling transmission mode (also referred to as a mode 3, that is, a mode 3) and a distributed transmission mode (also referred to as a mode 4 or referred to as a mode 4). In a V2X communication process, resource pools are configured for the centralized scheduling transmission mode and the distributed transmission mode. Specifically, FIG. 1A is a schematic diagram of a resource pool for a centralized scheduling transmission mode and a resource pool for a distributed transmission mode in the current technology. As shown in FIG. 1A, resources in the resource pool for the centralized scheduling transmission mode and resources in the resource pool for the distributed transmission mode are orthogonal. This static resource pool division manner causes low resource utilization. For example, a network device configures most of terminal devices in coverage of the network device to the distributed transmission mode, and configures a small part of the terminal devices to the centralized scheduling transmission mode. This may cause a heavier load of the resource pool corresponding to the distributed transmission mode and a lighter load of the resource pool corresponding to the centralized scheduling transmission mode. However, because the resources in the resource pool for the centralized scheduling transmission mode and the resources in the resource pool for the distributed transmission mode are orthogonal, a terminal device for which the distributed transmission mode is configured cannot use the resources in the resource pool corresponding to the centralized scheduling transmission mode. Consequently, low resource utilization is caused.

Figure 1B:
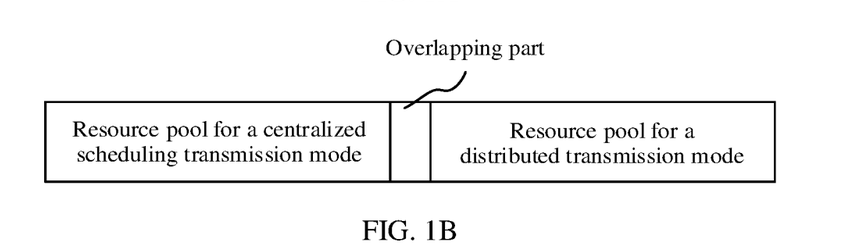
FIG. 1B is another schematic diagram of a resource pool for a centralized scheduling transmission mode and a resource pool for a distributed transmission mode in the current technology.

To avoid the low resource utilization caused by the resource configuration method in FIG. 1A, the resources in the resource pool for the centralized scheduling transmission mode and the resources in the resource pool for the distributed transmission mode may be allowed to be non-orthogonal. Specifically, FIG. 1B is another schematic diagram of a resource pool for a centralized scheduling transmission mode and a resource pool for a distributed transmission mode in the current technology. As shown in FIG. 1B, in this resource configuration manner, resources in the resource pool for the centralized scheduling transmission mode partially or completely overlap with resources in the resource pool for the distributed transmission mode, and the overlapping resources may be used for the centralized scheduling transmission mode and the distributed transmission mode. Because a network device cannot perceive a resource, in the overlapping resources, used by a terminal device (for example, a terminal device 1) for which the distributed transmission mode is configured, a resource allocated by the network device to a terminal device that is in the centralized scheduling transmission mode may possibly be the same as a resource selected by a terminal device (for example, a terminal device 2) that is in the distributed transmission mode. In this case, the terminal device 1 and the terminal device 2 use the same resource, resulting in a transmission collision and poor transmission reliability.

To enable the network device to perceive use statuses of resources in a current resource pool, or to enable the network device to learn of a resource, in the resource pool for the centralized scheduling transmission mode, used by the terminal device in the mode 4, the terminal device in the centralized scheduling transmission mode needs to report, to the network device, use statuses of resources in the resource pool for the centralized scheduling transmission mode, so that the network device allocates, based on the use statuses of the resources, an unoccupied resource to the terminal device in the centralized scheduling transmission mode, thereby improving transmission reliability.

However, when there is a relatively large quantity of resources in the centralized scheduling resource pool, an amount of data corresponding to use statuses of the resources is very large. Consequently, an uplink message sent by the terminal device is very large, and severe reporting overheads are caused.

In view of this, embodiments of this application provide a resource use status reporting method and a communications apparatus, where use statuses of resources in a centralized scheduling resource pool are reported to a network device, so that the network device allocates, based on the use statuses of the resources, an unoccupied resource to a terminal device that is in a centralized scheduling transmission mode, to improve transmission reliability.

The resource use status reporting method described in this application may be applied to various communications systems, for example, a wireless fidelity (Wifi) system, a worldwide interoperability for microwave access (WiMAX) system, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a 3rd generation mobile communications (3G) system, a long term evolution (LTE) system, an advanced long term evolution (LTE-A) system, a cellular system related to the 3rd generation partnership project (3GPP), a 5th generation mobile communications (5G) system, and another communications system.

A network device in the embodiments of this application may be a common base station (such as a NodeB, an eNB, or a gNB), a new radio controller (NR controller), a centralized unit, a new radio base station, a radio remote module, a micro base station, or a relay, a distributed unit, a reception point (TRP), a transmission point (TP), or any other device. However, the embodiments of this application are not limited thereto.

A terminal device in the embodiments of this application is a device that provides a user with voice and/or data connectivity, for example, a handheld device or a vehicle-mounted device having a wireless connection function. Common user equipment includes a mobile phone, a tablet, a notebook computer, a palmtop computer, a mobile internet device (MID), and a wearable device such as a smart watch, a smart band, and a pedometer. In V2X communication, a network device configures a transmission mode for each terminal, for example, a distributed transmission mode or a centralized scheduling transmission mode, and configures resource pools for the distributed transmission mode and the centralized scheduling transmission mode. Resources in the resource pool for the distributed transmission mode may partially or completely overlap with resources in the resource pool for the centralized scheduling transmission mode. A direct link is established between terminal devices, and communication is performed based on the direct link.

Figure 2:
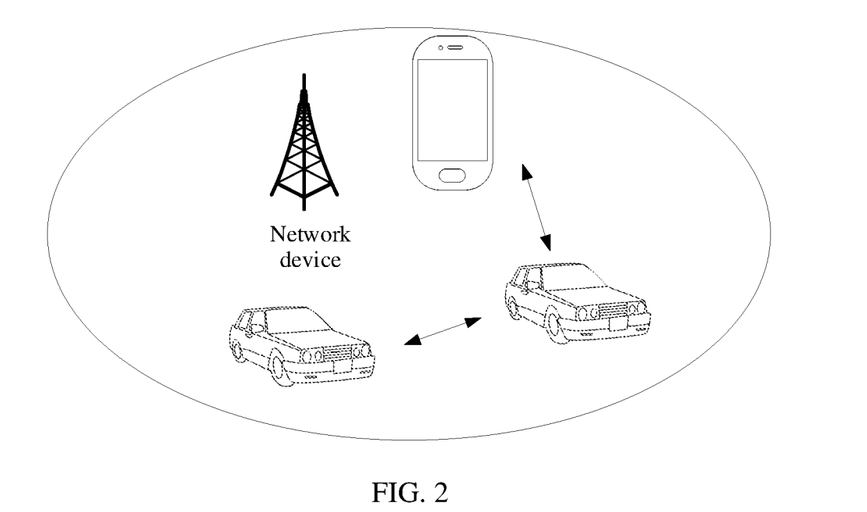
FIG. 2 is a schematic diagram of a scenario to which a resource use status reporting method is applicable according to an embodiment of this application.

FIG. 2 is a schematic diagram of a scenario to which a resource use status reporting method is applicable according to an embodiment of this application. Referring to FIG. 2, in coverage of a network device, a direct link is established between terminal devices, and communication is performed based on the direct link. The following describes in detail the resource use status reporting method in this embodiment of this application based on the scenario shown in FIG. 2. For details, refer to FIG. 3.

Figure 3:
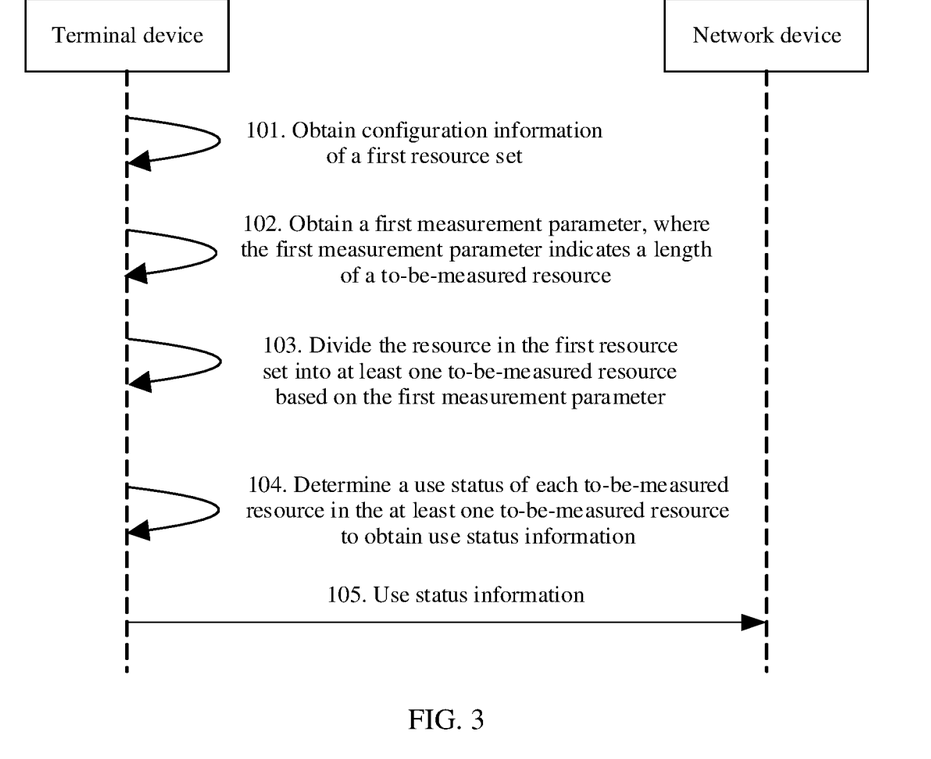
FIG. 3 is a flowchart of a resource use status reporting method according to an embodiment of this application.

FIG. 3 is a flowchart of a resource use status reporting method according to an embodiment of this application. This embodiment describes the resource use status reporting method described in this application from a perspective of interaction between a network device and a terminal. This embodiment includes the following steps.

101. The terminal device obtains configuration information of a first resource set.

The first resource set includes a resource in a centralized scheduling resource pool. The configuration information is used to indicate a location of a resource in the first resource set.

In this embodiment of this application, the first resource set includes some or all resources in the centralized scheduling resource pool. Referring to FIG. 1B, for example, the first resource set includes a resource in an overlapping part, that is, includes a resource overlapping between a resource pool for a centralized scheduling transmission mode and a resource pool for a distributed transmission mode. For another example, the first resource set includes all resources in a resource pool for a centralized scheduling transmission mode. For still another example, the first resource set includes all resources in a resource pool for a centralized scheduling transmission mode and some resources (a non-overlapping part) in a resource pool for a distributed transmission mode.

In this step, the terminal device obtains the configuration information of the first resource set, where the configuration information may be pre-configured or may be configured through higher layer signaling.

102. The terminal device obtains a first measurement parameter, where the first measurement parameter indicates a length of a to-be-measured resource.

In this embodiment of this application, the first measurement parameter is used to indicate a length of a to-be-measured resource in the first resource set. For example, the first to-be-measured parameter indicates a frequency domain length of a to-be-measured resource in a subframe. The frequency domain length is, for example, physical sub-channels for k direct links, k resource blocks (RB), k resource elements (RE), or k resource element groups (REG), where k is greater than or equal to 1. The first measurement parameter may be predefined or may be configured through higher layer signaling.

103. The terminal device divides the resource in the first resource set into at least one to-be-measured resource based on the first measurement parameter.

In this step, the terminal device divides the resource in the first resource set into the at least one to-be-measured resource based on the first measurement parameter. Specifically, the terminal device divides the resource in the first resource set based on the first measurement parameter, so that a length of each to-be-measured resource is equal to the first measurement parameter. During specific implementation, division into the to-be-measured resources may be performed for each subframe in the first transmission resource set. For details, refer to FIG. 4.

Figure 4:
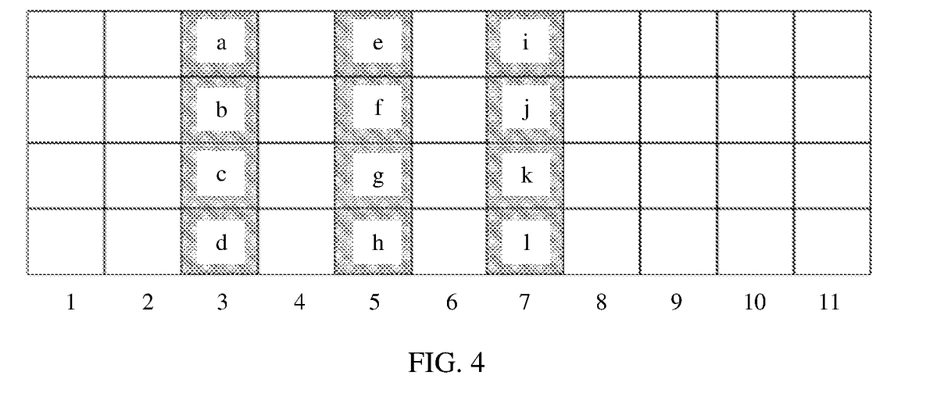
FIG. 4 is a schematic diagram of resource division to which a resource use status reporting method is applicable according to an embodiment of this application.

FIG. 4 is a schematic diagram of resource division to which the resource use status reporting method is applicable according to an embodiment of this application. Referring to FIG. 4, in 11 consecutive subframes, the first resource set includes resources in a shaded part, that is, includes the third, the fifth, and the seventh subframes. In frequency domain, each subframe includes four sub-channels. From top to bottom, identifiers of sub-channels in the third subframe are a, b, c, and d. Assuming that the length indicated by the first measurement parameter is two sub-channels, when the terminal device obtains the to-be-measured resource through division based on the first to-be-measured parameter, the terminal device combines two consecutive sub-channels to obtain three to-be-measured resources, which are {a, b}, {b, c}, and {c, d}.

104. The terminal device determines a use status of each to-be-measured resource in the at least one to-be-measured resource to obtain use status information.

In this embodiment of the present invention, for a specific to-be-measured resource, the use status information indicates that the to-be-measured resource has been used or has not been used.

In this step, the terminal device determines the use status of each to-be-measured resource according to a trigger condition to obtain use status information of the to-be-measured resources in the first resource set. For example, still referring to FIG. 4, the first resource set includes the third, the fifth, and the seventh subframes. For the third subframe, the terminal device needs to respectively determine use statuses of {a, b}, {b, c}, and {c, d}, to further obtain use status information. The trigger condition is, for example, a periodic trigger condition, or measurement is performed when load of a resource in the first resource set exceeds a preset threshold.

105. The terminal device sends the use status information to the network device.

After the use status of each to-be-measured resource in the first resource set is determined and the use status information of the to-be-measured resources in the first resource set is obtained, in this step, the terminal device reports the use status information to the network device.

According to the resource use status reporting method provided in the embodiments of this application, the terminal device divides the resource in the first resource set into a plurality of to-be-measured resources based on the first measurement parameter used to indicate the length of the to-be-measured resource, determines the use status of each to-be-measured resource to obtain the use status information, and then reports the use status information to the network device, so that the network device can perceive use statuses of resources in the centralized scheduling resource pool, thereby avoiding a collision between a resource allocated to a terminal device that is in a centralized scheduling mode and a resource that has been selected by a terminal device that is in a distributed transmission mode, and improving transmission reliability.

The following describes in detail how the terminal device determines the use status of each to-be-measured resource in the at least one to-be-measured resource to obtain the use status information in the foregoing embodiment.

In a feasible implementation, when the terminal device determines the use status of each to-be-measured resource in the at least one to-be-measured resource to obtain the use status information, for any one of the at least one to-be-measured resource, namely, a first to-be-measured resource, the terminal device obtains a first level parameter and a second level parameter, and determines a measurement threshold based on the first level parameter and the second level parameter. Then, the terminal device determines signal quality detected on the first to-be-measured resource, and determines a use status of the first to-be-measured resource based on the signal quality and the measurement threshold, to obtain use status information of the first to-be-measured resource. The first level parameter indicates a priority of to-be-sent data of the terminal device, and the second level parameter indicates a priority carried in a signal received by the terminal device on the first to-be-measured resource.

Specifically, to obtain the use status information of the first to-be-measured resource, the terminal device needs to obtain at least four parameters: the first level parameter, the second level parameter, the measurement threshold, and the signal quality detected by the terminal device on the first to-be-measured resource. The following describes how the terminal device obtains the four parameters in detail.

First, the first level parameter is described.

In this embodiment of this application, the first level parameter is the priority of the current to-be-sent data of the terminal device. The to-be-sent data is stored in a buffer of the terminal device. During specific implementation, the terminal device may obtain the first level parameter in the following manners.

Manner 1: The terminal device obtains the first level parameter via the network device.

Specifically, the network device sends the first level parameter to the terminal device through radio resource control (RRC) signaling, system information, and the like. Correspondingly, the terminal device receives the first level parameter.

Manner 2: The terminal device determines the first level parameter by using carried data corresponding to a logical channel.

Specifically, in V2X communication, each piece of carried data belongs to one logical channel, and each piece of carried data corresponds to one level parameter. In other words, each logical channel corresponds to one level parameter. When determining the first level parameter, the terminal device determines the first level parameter from level parameters corresponding to a plurality of logical channels. For example, a level parameter with the highest level is determined from the plurality of level parameters, and the highest level parameter is used as the first level parameter. For another example, one level parameter is randomly selected from the plurality of level parameters as the first level parameter.

For example, a value of a level parameter corresponding to first carried data is 1, a value of a level parameter corresponding to second carried data is 4, and a value of a level parameter corresponding to third carried data is 2. The first carried data, the second carried data, and the third carried data belong to a logical channel 1, a logical channel 2, and a logical channel 3 respectively. In this case, values of level parameters corresponding to the logical channel 1, the logical channel 2, and the logical channel 3 are 1, 4, and 2 respectively. In this case, the terminal device may use the highest level parameter 1 in the level parameters corresponding to the three logical channels as the first level parameter. For another example, the terminal device may randomly select a level parameter from the three level parameters as the first level parameter, for example, select the level parameter 2 as the first level parameter.

Manner 3: The terminal device determines the first level parameter based on a level parameter set. The level parameter set includes at least one level parameter.

Specifically, the level parameter set may be predefined or may be configured through higher layer signaling. The terminal device randomly selects a level parameter from the level parameter set as the first level parameter, or selects, from the level parameter set based on an algorithm, a level parameter as the first level parameter. For example, it is assumed that the level parameter set includes eight level parameters, and values of the eight level parameters are 1 to 8. The terminal device selects 3 from 1 to 8 as the first level parameter.

Second, the second level parameter is described.

In this embodiment of this application, the second level parameter is the priority carried in the data received by the terminal device on the first to-be-measured resource. Specifically, when the terminal device receives, on the first to-be-measured resource, data sent by another terminal device, a level parameter carried in the data is the second level parameter, and the second level parameter is also referred to as a level parameter of the first to-be-measured resource.

Third, the measurement threshold is described.

After obtaining the first level parameter and the second level parameter, the terminal device determines the measurement threshold based on the first level parameter and the second level parameter. During specific implementation, a correspondence between the measurement threshold and a combination of the first level parameter and the second level parameter may be predefined or may be configured through higher layer signaling. For example, the first level parameter is 2, the second level parameter is 5, and the measurement threshold is 20 dbm. For another example, the first level parameter is 4, the second level parameter is 8, and the measurement threshold is 25 dbm.

Finally, the signal quality is described.

In this embodiment of this application, the signal quality is the signal quality detected by the terminal device on the first to-be-measured resource.

After obtaining the foregoing parameters, the terminal device determines the use status of the first to-be-measured resource based on the signal quality and the measurement threshold. For example, if the signal quality does not exceed the measurement threshold, it is considered that the first to-be-measured resource is not used. If the signal quality exceeds the measurement threshold, it is considered that the first to-be-measured resource is used, and the network device cannot allocate the first to-be-measured resource to a terminal device that is in a centralized scheduling transmission mode.

In addition, to further improve transmission reliability, after determining used to-be-measured resources from the at least one to-be-measured resource in the first resource set based on the measurement threshold and the signal quality, the terminal device sorts unused to-be-measured resources in ascending order of the signal quality, uses first k % of to-be-measured resources with relatively low signal quality as unused resources, and uses remaining (100−k)/% of to-be-measured resources as used to-be-measured resources. k is predefined, or is configured by a network. For example, k=20.

In this embodiment, the terminal device determines the use status of the first to-be-measured resource by using the first level parameter, the second level parameter, the measurement threshold, and the signal quality on the first to-be-measured resource.

The following describes in detail the use status information in the foregoing embodiment.

In a feasible implementation, the use status information specifically includes a first bitmap. Bit fields in the first bitmap correspond to different to-be-measured resources. A value of each bit field in the first bitmap indicates a use status of a to-be-measured resource corresponding to the bit field. A location of each bit field in the first bitmap indicates a location of a to-be-measured resource corresponding to the bit field.

Specifically, in this implementation, to-be-measured resources of a plurality of subframes use same bitmap information, namely, the first bitmap. Still referring to FIG. 4, the first resource set includes the third, the fifth, and the seventh subframes. Assuming that the length indicated by the first measurement parameter is two sub-channels, for the subframes from top to bottom, when the terminal device obtains the to-be-measured resource through division based on the first to-be-measured parameter, the terminal device combines two consecutive sub-channels to obtain three to-be-measured resources. Three to-be-measured resources corresponding to the third subframe are {a, b}, {b, c}, and {c, d}, three to-be-measured resources corresponding to the fifth subframe are {e, f}, {f, g}, and {g, h}, and three to-be-measured resources corresponding to the seventh subframe are {i, j}, {j, k}, and {k, l}. After measuring each to-be-measured resource, reported use status information includes the first bitmap. For example, the bitmap is 110101001. From left to right, bit information sequentially indicates use statuses of {a, b}, {b, c}, {c, d}, {e, f}, {f, g}, {g, h}, {i, j}, {j, k}, and {k, l}. 1 indicates that a to-be-measured resource is not used, and 0 indicates that a to-be-measured resource is used.

In this embodiment, the terminal device reports use statuses of the to-be-measured resources of the plurality of subframes to the network device by using one bitmap. In this process, the bitmap can include use status information of a relatively large quantity of to-be-measured resources, and bitmap overheads are relatively small, so that reporting overheads are reduced while the terminal device reports as much use status information as possible.

In a feasible implementation, the use status information specifically includes at least one second bitmap. Each second bitmap corresponds to one subframe. Bit fields in the second bitmap correspond to different to-be-measured resources in the subframe corresponding to the second bitmap. A value of each bit field in the second bitmap indicates a use status of a to-be-measured resource corresponding to the bit field. A location of each bit field in the second bitmap indicates a location of a to-be-measured resource corresponding to the bit field.

Compared with the foregoing reporting manner in which the use status information of the to-be-measured resources of the plurality of subframes is reported to the network device by using one bitmap (namely, the first bitmap), in this implementation, the terminal device reports use status information of to-be-measured resources of different subframes to the network device by using different bitmaps. Still referring to FIG. 4, after the terminal device measures each to-be-measured resource, reported use status information includes three second bitmaps, and each second bitmap is 3 bits, which are 110, 101, and 001. The terminal device also needs to report a subframe corresponding to the second bitmap to the network device. After receiving the second bitmap, the network device needs to determine the subframe corresponding to the second bitmap, and then determine use status information of a to-be-transmitted resource in the subframe. The following describes in detail how the terminal device reports the subframe corresponding to the second bitmap to the network device.

Specifically, the terminal device may include time domain information in the use status information, and report the use status information to the network device. The time domain information is used to indicate a time domain location of the subframe corresponding to the second bitmap. During specific implementation, the terminal device reports the location of the subframe corresponding to the second bitmap to the network device in the following manners.

Manner 1: The terminal device indicates the specific location of the subframe corresponding to the second bitmap to the network device.

In this manner, the time domain information includes at least one piece of first indication information, where each piece of first indication information corresponds to one second bitmap, and the first indication information indicates the subframe location of the subframe corresponding to the second bitmap. For example, the first indication information may be an absolute subframe number.

Specifically, each second bitmap corresponds to one subframe, each subframe corresponds to one piece of first indication information, and the first indication information is used to indicate a time domain location of the subframe. The terminal device sends the first indication information corresponding to each second bitmap to the network device. For example, the use status information sent by the terminal device to the network device includes three second bitmaps, which are no, 101, and 001. In addition, the use status information further includes three pieces of first indication information, which indicate that a subframe corresponding to the second bitmap no is the third subframe, a subframe corresponding to the second bitmap 101 is the fifth subframe, and a subframe corresponding to the second bitmap 001 is the seventh subframe.

Manner 2: The terminal device indicates, to the network device, offset information of a location of the subframe corresponding to the second bitmap relative to a reference subframe location of a reference subframe, and the reference subframe location.

In this manner, the time domain information includes the reference subframe location and indicates one piece of offset information. Each piece of offset information corresponds to one second bitmap. The offset information indicates an offset of the location of the subframe corresponding to the second bitmap relative to the reference subframe location. Still referring to FIG. 4, the use status information sent by the terminal device to the network device includes three second bitmaps, which are 110, 101, and 001. In addition, the use status information further includes a reference subframe location and three pieces of offset information, and the reference subframe location is the first subframe. The three pieces of offset information indicate that the second bitmap no offsets two subframes relative to the reference subframe location, the second bitmap 101 offsets four subframes relative to the reference subframe location, and the second bitmap ow offsets six subframes relative to the reference subframe location. In this case, a subframe corresponding to the second bitmap no is the third subframe, a subframe corresponding to the second bitmap 101 is the fifth subframe, and a subframe corresponding to the second bitmap ow is the seventh subframe.

Manner 3: The terminal device indicates the location of the subframe corresponding to the second bitmap to the network device by using a third bitmap.

In this manner, the time domain information includes the third bitmap. Each bit field in the third bitmap corresponds to one subframe. A value of each bit field in the third bitmap indicates whether a subframe corresponding to the bit field corresponds to one second bitmap. A location of each bit field in the third bitmap indicates a time domain location of a subframe corresponding to the bit field. Still referring to FIG. 4, the use status information sent by the terminal device to the network device includes three second bitmaps, and a sending sequence is 110, 101, and 001. In addition, the use status information further includes a third bitmap, and the third bitmap is, for example, 00101010000. It can be learned based on the third bitmap that the second bitmap 101 offsets five subframes relative to the reference subframe location, and the second bitmap ow offsets seven subframes relative to the reference subframe location. In this case, a subframe corresponding to the second bitmap no is the third subframe, a subframe corresponding to the second bitmap 101 is the fifth subframe, and a subframe corresponding to the second bitmap 001 is the seventh subframe.

In this embodiment, the terminal device reports use statuses of to-be-measured resources of a plurality of subframes to the network device by using one bitmap. In this process, the bitmap can include use status information of a relatively large quantity of to-be-measured resources, and bitmap overheads are relatively small, so that reporting overheads are reduced while the terminal device reports as much use status information as possible.

The following describes in detail how the terminal device obtains the first measurement parameter in the foregoing embodiment. Specifically, the terminal device may obtain the first measurement parameter in the following manners.

Manner 1: The terminal device receives the first measurement parameter sent by the network device.

In this implementation, the network device sends the first measurement parameter to the terminal device by using RRC dedicated control information or system information. Correspondingly, the terminal device receives the measurement parameter.

Manner 2: The terminal device receives at least one second measurement parameter sent by the network device, and determines the first measurement parameter from the at least one second measurement parameter.

In this implementation, the network device sends a plurality of second measurement parameters to the terminal device by using RRC dedicated control information or system information. Correspondingly, the terminal device receives the plurality of second measurement parameters, selects one second measurement parameter from the plurality of second measurement parameters, and uses the selected second measurement parameter as the first measurement parameter. In the selection process, the terminal device selects a second parameter according to a protocol specification. Alternatively, the terminal device randomly selects a second measurement parameter as the first measurement parameter.

Manner 3: The terminal device determines the first measurement parameter based on a third measurement parameter and a fourth measurement parameter. The first measurement parameter is greater than or equal to the third measurement parameter. The first measurement parameter is less than or equal to the fourth measurement parameter. The third measurement parameter and the fourth measurement parameter are predefined, or are configured through higher layer signaling.

In this implementation, the third measurement parameter and the fourth measurement parameter are pre-configured or are configured through higher layer signaling. The terminal device obtains a measurement parameter value range based on the third measurement parameter and the fourth measurement parameter. Then, the terminal device selects a measurement parameter from the value range as the first measurement parameter.

In this embodiment, the terminal device obtains the first measurement parameter.

The following describes in detail how the network device determines the first resource set from the centralized scheduling resource pool in the foregoing embodiment.

In a feasible implementation, before the terminal device divides the resource in the first resource set into the at least one to-be-measured resource based on the first measurement parameter, the terminal device further determines the first resource set based on the configuration information, where the configuration information is used to indicate the location of the resource in the first resource set.

Specifically, the configuration information is predefined, or is configured through higher layer signaling. The configuration information indicates the location of the resource in the first resource set, for example, a time domain location, for another example, a time domain location and a frequency domain location. For example, still referring to FIG. 4, a time domain location of a resource pool for the centralized scheduling transmission mode starts from the first subframe and lasts to the eleventh subframe. In the bitmap whose configuration information is 00101010000, a time domain location corresponding to "1" is a time domain location of the resource in the first resource set, and a frequency domain location of the resource in the first resource set (that is, all frequency domain locations of a subframe in the first resource set) is the same as a frequency domain location of a resource in the resource pool for the centralized scheduling transmission mode.

In this embodiment, the terminal device determines the first resource set.

In the foregoing embodiment, a second resource set includes the resource in the centralized scheduling resource pool, and the first resource set is a subset of the second resource set. In this case, when determining the use status information of the to-be-measured resources in the first resource pool, the terminal device may measure only the first resource set at a physical layer of the terminal device, and after obtaining the use status information of the to-be-measured resources in the first resource set, report the use status information to the network device.

To avoid a great change in a current protocol, when determining the use status information of the to-be-measured resources in the first resource pool, the terminal device may alternatively measure the entire resource pool that is for the centralized scheduling mode at a physical layer of the terminal device, that is, all to-be-measured resources in the second resource set, to obtain use status information of each resource in the second resource set. Then, the terminal device feeds back the use status information of each resource in the second resource set to an upper layer of the terminal device, for example, a media access control (MAC) layer. The terminal device obtains the use status information of each resource in the second resource set based on cooperation information of the first resource set at the MAC layer, and determines use status information of each resource in the first resource set. Then, the terminal device reports the use status information of each resource in the first resource set to the network device at the MAC layer.

In this embodiment, the terminal device first measures each to-be-measured resource in the second resource set to obtain the use status information of each to-be-measured resource in the second resource set, and then determines the use status information of each to-be-measured resource in the first resource set from the use status information of each to-be-measured resource in the second resource set based on the configuration information of the first resource set, to avoid a great change in a current protocol, so that the network device can perceive a use status of the resource in the centralized scheduling resource pool, thereby avoiding a collision between a resource allocated to a terminal device that is in a centralized scheduling mode and a resource that has been selected by a terminal device that is in a distributed transmission mode, and improving transmission reliability.

It should be noted that, in the foregoing embodiment, when sending the use status information to the network device, the terminal device may include the first measurement parameter in the use status information and send the use status information to the network device. Alternatively, the terminal device may send the first measurement parameter to the network device in another manner. After receiving the first measurement parameter, the network device determines the use status information of the to-be-measured resources in the first resource set based on the first measurement parameter and a bitmap, for example, the first bitmap or the second bitmap. In this process, the status use status information is reported by combining the bitmap and the first measurement parameter, to ensure that reporting overheads are reduced while the network device obtains as much use status information as possible.

Figure 5:
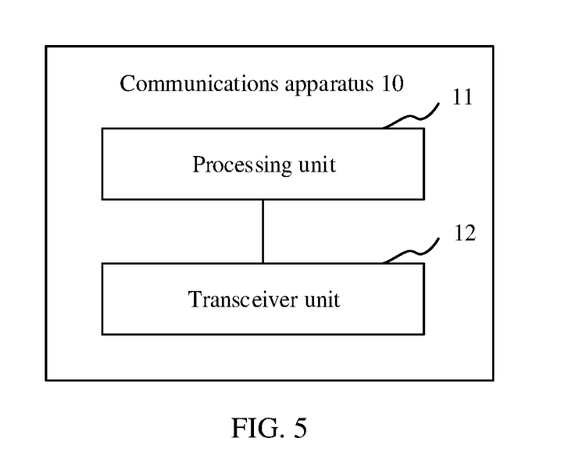
FIG. 5 is a schematic structural diagram of a communications apparatus according to an embodiment of this application.

FIG. 5 is a schematic structural diagram of a communications apparatus according to an embodiment of this application. The communications apparatus in this embodiment may be the terminal device described above, or may be a chip used in the terminal device. The communications apparatus may be configured to perform actions of the terminal device in the foregoing method embodiment. As shown in FIG. 5, the communications apparatus 10 may include a processing unit 11 and a transceiver unit 12.

The processing unit 11 is configured to: obtain configuration information of a first resource set and a first measurement parameter, divide a resource in the first resource set into at least one to-be-measured resource based on the first measurement parameter, and determine a use status of each to-be-measured resource in the at least one to-be-measured resource to obtain use status information, where the first resource set includes a resource in a centralized scheduling resource pool, and the configuration information is used to indicate a location of the resource in the first resource set.

The transceiver unit 12 is configured to send the use status information to a network device.

In a feasible implementation, the processing unit 11 is specifically configured to: when determining the use status of each to-be-measured resource in the at least one to-be-measured resource to obtain the use status information, obtain a first level parameter, a second level parameter, and signal quality detected on the first to-be-measured resource, determine a measurement threshold based on the first level parameter and the second level parameter, and determine a use status of the first to-be-measured resource based on the signal quality and the measurement threshold to obtain use status information of the first to-be-measured resource, where the first level parameter indicates a priority of to-be-sent data of the terminal device, the second level parameter indicates a priority carried in data received by the terminal device on the first to-be-measured resource, and the first to-be-measured resource is any one of the at least one to-be-measured resource.

In a feasible implementation, the processing unit 11 is specifically configured to: when obtaining the first level parameter, receive the first level parameter sent by the network device.

Alternatively, the processing unit 11 is specifically configured to: when obtaining the first level parameter, determine the first level parameter from at least one level parameter, where each level parameter in the at least one level parameter corresponds to one piece of carried data, and each piece of carried data corresponds to a logical channel of one direct link of the terminal device; and the first level parameter is any one of the at least one level parameter, or the first level parameter is a highest level parameter in the at least one level parameter.

Alternatively, the processing unit 11 is specifically configured to: when obtaining the first level parameter, determine the first level parameter based on a level parameter set, where the level parameter set includes at least one level parameter.

In a feasible implementation, the use status information specifically includes a first bitmap. Bit fields in the first bitmap correspond to different to-be-measured resources. A value of each bit field in the first bitmap indicates a use status of a to-be-measured resource corresponding to the bit field. A location of each bit field in the first bitmap indicates a location of a to-be-measured resource corresponding to the bit field.

In a feasible implementation, the use status information specifically includes at least one second bitmap. Each second bitmap corresponds to one subframe. Bit fields in the second bitmap correspond to different to-be-measured resources in the subframe corresponding to the second bitmap. A value of each bit field in the second bitmap indicates a use status of a to-be-measured resource corresponding to the bit field. A location of each bit field in the second bitmap indicates a location of a to-be-measured resource corresponding to the bit field.

In a feasible implementation, the use status information further includes time domain information. The time domain information is used to indicate a location of the subframe corresponding to the second bitmap. The time domain information includes: at least one piece of first indication information, where each piece of first indication information corresponds to one second bitmap, and the first indication information indicates the subframe location of the subframe corresponding to the second bitmap; or second indication information and at least one piece of offset information, where the second indication information indicates a reference subframe location of a reference subframe, each piece of offset information corresponds to one second bitmap, and the offset information indicates a location of the subframe corresponding to the second bitmap relative to the reference subframe; or a third bitmap, where each bit field in the third bitmap corresponds to one subframe, a value of each bit field in the third bitmap indicates whether a subframe corresponding to the bit field corresponds to one second bitmap, and a location of each bit field in the third bitmap indicates a time domain location of a subframe corresponding to the bit field.

In a feasible implementation, the processing unit 11 is specifically configured to: when obtaining the first measurement parameter, receive the first measurement parameter sent by the network device.

Alternatively, the processing unit 11 is specifically configured to: when obtaining the first measurement parameter, receive at least one second measurement parameter sent by the network device, and determine the first measurement parameter from the at least one second measurement parameter.

Alternatively, the processing unit 11 is specifically configured to: when obtaining the first measurement parameter, determine the first measurement parameter based on a third measurement parameter and a fourth measurement parameter, where the first measurement parameter is greater than or equal to the third measurement parameter, the first measurement parameter is less than or equal to the fourth measurement parameter, and the third measurement parameter and the fourth measurement parameter are predefined, or are configured through higher layer signaling.

In a feasible implementation, the transceiver unit 12 is further configured to send the first measurement parameter to the network device.

In a feasible implementation, the first resource set is a subset of a second resource set, and the second resource set includes the resource in the centralized scheduling resource pool.

The processing unit 11 is specifically configured to: when determining the use status of each to-be-measured resource in the at least one to-be-measured resource to obtain the use status information, divide a resource in the second resource set into at least one to-be-measured resource based on the first measurement parameter; determine a use status of each to-be-measured resource in the at least one to-be-measured resource corresponding to the second resource set to obtain use status information of each resource in the second resource set; and determine use status information of each resource in the first resource set from the use status information of each resource in the second resource set based on the configuration information.

The communications apparatus provided in this embodiment of this application may perform the actions of the terminal device in the foregoing method embodiment. Implementation principles and technical effects thereof are similar, and details are not described herein again.

Figure 6:
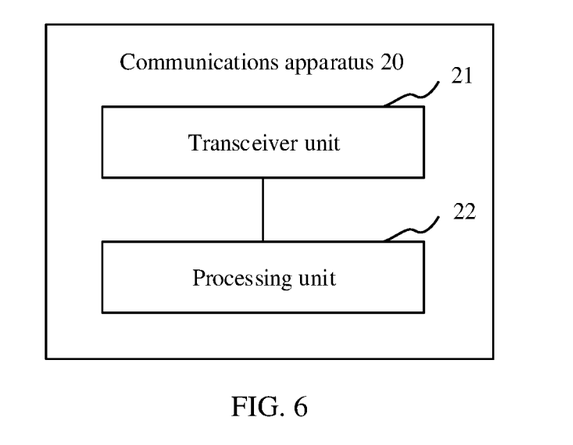
FIG. 6 is a schematic structural diagram of a communications apparatus according to an embodiment of this application.

FIG. 6 is a schematic structural diagram of a communications apparatus according to an embodiment of this application. The communications apparatus in this embodiment may be the network device described above, or may be a chip used in the network device. The communications apparatus may be configured to perform actions of the network device in the foregoing method embodiment. As shown in FIG. 6, the communications apparatus 20 may include a transceiver unit 21 and a processing unit 21.

The transceiver unit 21 is configured to receive use status information sent by a terminal device, where the use status information is used to indicate a use status of each to-be-measured resource in at least one to-be-measured resource in a first resource set, and the first resource set includes a resource in a centralized scheduling resource pool; and the use status is determined by the network device based on a first measurement parameter, and the first measurement parameter indicates a length of the to-be-measured resource.

The processing unit 22 is configured to allocate the resource in the scheduling resource pool based on the use status information.

In a feasible implementation, the transceiver unit 21 is further configured to: before receiving the use status information sent by the terminal device, send a first level parameter to the terminal device, where the first level parameter indicates a priority of to-be-sent data of the terminal device.

In a feasible implementation, the use status information specifically includes a first bitmap. Bit fields in the first bitmap correspond to different to-be-measured resources. A value of each bit field in the first bitmap indicates a use status of a to-be-measured resource corresponding to the bit field. A location of each bit field in the first bitmap indicates a location of a to-be-measured resource corresponding to the bit field.

In a feasible implementation, the use status information specifically includes at least one second bitmap. Each second bitmap corresponds to one subframe. Bit fields in the second bitmap correspond to different to-be-measured resources in the subframe corresponding to the second bitmap. A value of each bit field in the second bitmap indicates a use status of a to-be-measured resource corresponding to the bit field. A location of each bit field in the second bitmap indicates a location of a to-be-measured resource corresponding to the bit field.

In a feasible implementation, the use status information further includes time domain information. The time domain information is used to indicate a location of the subframe corresponding to the second bitmap. The time domain information includes: at least one piece of first indication information, where each piece of first indication information corresponds to one second bitmap, and the first indication information indicates the subframe location of the subframe corresponding to the second bitmap; or second indication information and at least one piece of offset information, where the second indication information indicates a reference subframe location of a reference subframe, each piece of offset information corresponds to one second bitmap, and the offset information indicates a location of the subframe corresponding to the second bitmap relative to the reference subframe; or a third bitmap, where each bit field in the third bitmap corresponds to one subframe, a value of each bit field in the third bitmap indicates whether a subframe corresponding to the bit field corresponds to one second bitmap, and a location of each bit field in the third bitmap indicates a time domain location of a subframe corresponding to the bit field.

In a feasible implementation, the transceiver unit 21 is further configured to: before receiving the use status information sent by the terminal device, send the first measurement parameter to the terminal device.

In a feasible implementation, the transceiver unit 21 is further configured to receive the first measurement parameter sent by the terminal device.

It should be noted that, it should be understood that the receiving unit may be a receiver during actual implementation, and the sending unit may be a transmitter during actual implementation. In addition, the processing unit may be implemented in a form of software invoked by a processing element, or may be implemented in a form of hardware. For example, the processing unit may be a separately disposed processing element, or may be integrated into a chip of the foregoing apparatus for implementation. In addition, the processing unit may be stored in a memory of the foregoing apparatus in a form of program code, and is invoked by a processing element of the foregoing apparatus to perform a function of the processing unit. In addition, some or all of the units may be integrated together, or the units may be implemented independently. Herein, the processing element may be an integrated circuit and has a signal processing capability. In an implementation process, steps in the foregoing methods or the foregoing units can be implemented by using a hardware integrated logical circuit in the processing element, or by using instructions in a form of software.

For example, the foregoing units may be configured as one or more integrated circuits implementing the foregoing methods, for example, one or more application-specific integrated circuits (ASIC), one or more microprocessors (DSP), or one or more field programmable gate arrays (FPGA). For another example, when one of the foregoing units is implemented by scheduling program code by a processing element, the processing element may be a general purpose processor, for example, a central processing unit (CPU) or another processor that can invoke program code. For another example, these units may be integrated together and implemented in a form of a system-on-a-chip (SOC).

Figure 7:
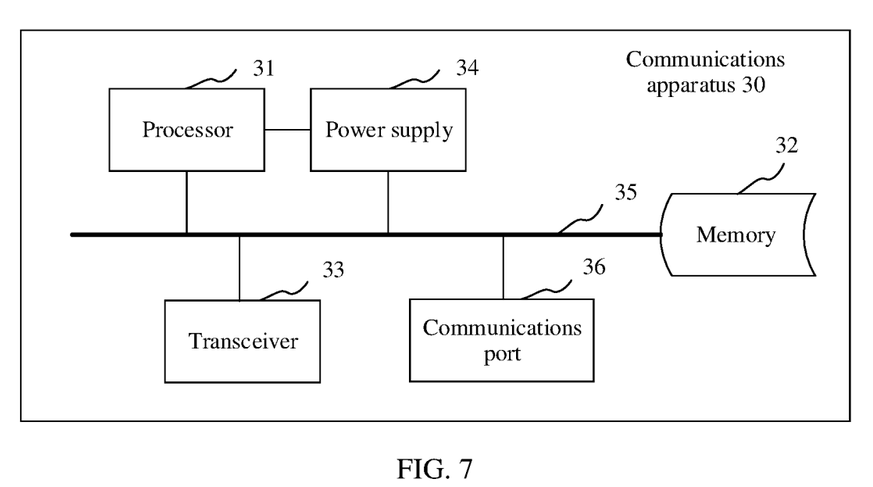
FIG. 7 is a schematic structural diagram of a communications apparatus according to another embodiment of this application.

FIG. 7 is a schematic structural diagram of a communications apparatus according to another embodiment of this application. As shown in FIG. 7, the communications apparatus 30 may include a processor 31 (for example, a CPU), a memory 32, and a transceiver 33. The transceiver 33 is coupled to the processor 31. The processor 31 controls receiving and sending actions of the transceiver 33. The memory 32 may include a high-speed random-access memory (RAM), and may further include a non-volatile memory (NVM), for example, at least one disk memory. The memory 32 may store various instructions, to complete various processing functions and implement the method steps in this application. Optionally, the communications apparatus in this application may further include a power supply 34, a communications bus 35, and a communications port 36. The transceiver 33 may be integrated into a transceiver of the communications apparatus, or may be an independent transceiver antenna on the communications apparatus. The communications bus 35 is configured to implement communication connection between components. The communications port 36 is configured to implement communication connection between the communications apparatus and another peripheral.

In this embodiment of this application, the memory 32 is configured to store computer executable program code, where the program code includes an instruction. When the processor 31 executes the instruction, the instruction enables the processor 31 of the communications apparatus to perform processing actions of the network device in the foregoing method embodiment, and enables the transceiver 33 to perform receiving and sending actions of the terminal device in the foregoing method embodiment. Implementation principles and technical effects thereof are similar, and details are not described herein again.

Figure 8:
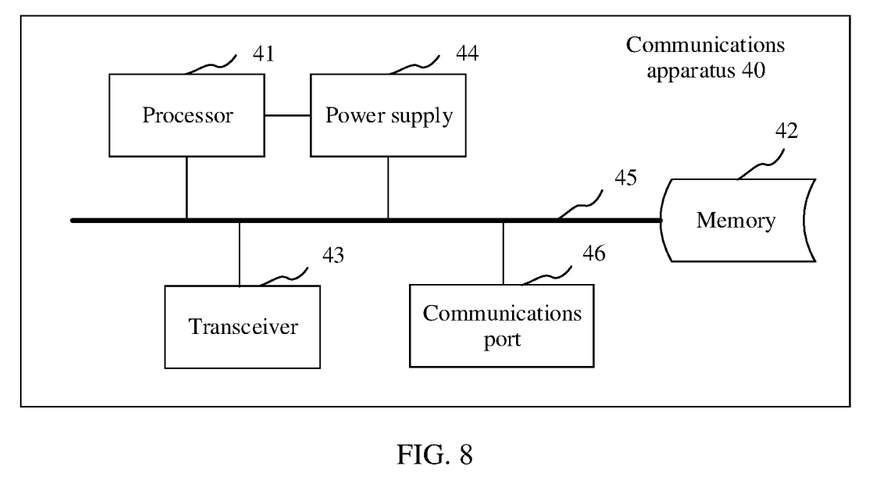
FIG. 8 is a schematic structural diagram of another communications apparatus according to an embodiment of this application.

FIG. 8 is a schematic structural diagram of another communications apparatus according to an embodiment of this application. As shown in FIG. 8, the communications apparatus may include a processor 41 (for example, a CPU), a memory 42, and a transceiver 43. The transceiver 43 is coupled to the processor 41. The processor 41 controls actions of the transceiver 43. The memory 42 may include a high-speed random-access memory (RAM), and may further include a non-volatile memory (NVM), for example, at least one disk memory. The memory 42 may store various instructions, to complete various processing functions and implement method steps of this application. Optionally, the communications apparatus in this application may further include a power supply 44, a communications bus 45, and a communications port 46. The communications bus 45 is configured to implement communication connection between components. The communications port 46 is configured to implement communication connection between the communications apparatus and another peripheral.

In this embodiment of this application, the memory 42 is configured to store computer executable program code, where the program code includes an instruction. When the processor 41 executes the instruction, the instruction enables the processor 41 of the communications apparatus to perform actions of the user equipment in the foregoing method embodiment, and enables the transceiver 43 to perform receiving and sending actions of the network device in the foregoing method embodiment. Implementation principles and technical effects thereof are similar, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the description manner "at least one of . . . " in this specification represents one of listed items or any combination thereof. For example, "at least one of A, B, and C" may represent the following six cases: A exists alone, B exists alone, C exists alone, both A and B exist, both B and C exist, both A and C exist, and all of A, B, and C exist. In addition, the character "/" in this specification usually indicates an "or" relationship between associated objects. In the formula, the character "/" indicates a "division" relationship between associated objects.

It may be understood that numeric numbers used in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A method, comprising:
   obtaining, by a terminal device, configuration information of a first resource set, wherein the first resource set comprises a first resource in a centralized scheduling resource pool, and the configuration information indicates a location of a second resource in the first resource set, and wherein the first resource and the second resources are same resources or different resources;
   obtaining, by the terminal device, a first measurement parameter, wherein the first measurement parameter indicates a length of a to-be-measured resource;
   dividing, by the terminal device, the second resource in the first resource set into at least one to-be-measured resource based on the first measurement parameter;
   determining, by the terminal device, a use status of each to-be-measured resource in the at least one to-be-measured resource to obtain use status information; and
   sending, by the terminal device, the use status information to a network device.

2. The method according to claim 1, wherein determining, by the terminal device, the use status of each to-be-measured resource in the at least one to-be-measured resource to obtain use status information comprises:
   obtaining, by the terminal device, a first level parameter, wherein the first level parameter indicates a priority of to-be-sent data of the terminal device;
   obtaining, by the terminal device, a second level parameter, wherein the second level parameter indicates a priority carried in data received by the terminal device on a first to-be-measured resource of the at least one to-be-measured resource;
   determining, by the terminal device, a measurement threshold based on the first level parameter and the second level parameter;
   determining, by the terminal device, signal quality detected on the first to-be-measured resource; and
   determining, by the terminal device, a use status of the first to-be-measured resource based on the signal quality and the measurement threshold, to obtain use status information of the first to-be-measured resource.

3. The method according to claim 2, wherein obtaining, by the terminal device, the first level parameter comprises:
   receiving, by the terminal device, the first level parameter sent by the network device.

4. The method according to claim 2, further comprising:
   sending, by the network device, the first level parameter to the terminal device.

5. The method according to claim 1, wherein the use status information comprises a first bitmap, bit fields in the first bitmap correspond to different to-be-measured resources, a value of each bit field in the first bitmap indicates a use status of a to-be-measured resource corresponding to the bit field, and a location of each bit field in the first bitmap indicates a location of a to-be-measured resource corresponding to the bit field.

6. The method according to claim 1, wherein the use status information comprises at least one second bitmap, each second bitmap of the at least one second bitmap corresponds to one subframe, bit fields in each second bitmap of the at least one second bitmap correspond to different to-be-measured resources in the respective subframe corresponding to the respective second bitmap, a value of each bit field in each second bitmap of the at least one second bitmap indicates a use status of a to-be-measured resource corresponding to the respective bit field, and a location of each bit field in each second bitmap of the at least one second bitmap indicates a location of a to-be-measured resource corresponding to the respective bit field.

7. The method according to claim 1, wherein obtaining, by the terminal device, the first measurement parameter comprises:
   receiving, by the terminal device, the first measurement parameter sent by the network device.

8. The method according to claim 1, further comprising:
   sending, by the terminal device, the first measurement parameter to the network device.

9. The method according to claim 1, wherein:
   the first resource set is a subset of a second resource set, and the second resource set comprises the first resource in the centralized scheduling resource pool; and
   determining, by the terminal device, the use status of each to-be-measured resource in the at least one to-be-measured resource, to obtain the use status information comprises:
      dividing, by the terminal device, a resource in the second resource set into at least one to-be-measured resource based on the first measurement parameter;
      determining, by the terminal device, a use status of each to-be-measured resource in the at least one to-be-measured resource corresponding to the second resource set, to obtain use status information of each resource in the second resource set; and
      determining, by the terminal device, use status information of each resource in the first resource set from the use status information of each resource in the second resource set based on the configuration information.

10. A terminal apparatus, comprising:
    a processor; and
    a non-transitory memory coupled to the processor, wherein the non-transitory memory comprises instructions that, when executed by the processor, cause the terminal apparatus to perform operations comprising:
       obtaining configuration information of a first resource set, wherein the first resource set comprises a first resource in a centralized scheduling resource pool, and the configuration information indicates a location of a second resource in the first resource set, and wherein the first resource and the second resource are the same resource or different resources;
       obtaining a first measurement parameter, wherein the first measurement parameter indicates a length of a to-be-measured resource;
       dividing the second resource in the first resource set into at least one to-be-measured resource based on the first measurement parameter;
       determining a use status of each to-be-measured resource in the at least one to-be-measured resource, to obtain use status information; and
       sending the use status information to a network device.

11. The terminal apparatus according to claim 10, wherein the operations comprise:
    obtaining a first level parameter, wherein the first level parameter indicates a priority of to-be-sent data of the terminal apparatus;
    obtaining a second level parameter, wherein the second level parameter indicates a priority carried in data received by the terminal apparatus on a first to-be-measured resource of the at least one to-be-measured resource;
    determining a measurement threshold based on the first level parameter and the second level parameter;

determining a signal quality detected on the first to-be-measured resource; and determining, by the terminal apparatus, a use status of the first to-be-measured resource based on the signal quality and the measurement threshold, to obtain use status information of the first to-be-measured resource.

12. The terminal apparatus according to claim 11, wherein the operations comprise:

receiving the first level parameter sent by the network device.

13. The terminal apparatus according to claim 10, wherein the use status information comprises a first bitmap, bit fields in the first bitmap correspond to different to-be-measured resources, a value of each bit field in the first bitmap indicates a use status of a to-be-measured resource corresponding to the bit field, and a location of each bit field in the first bitmap indicates a location of a to-be-measured resource corresponding to the bit field.

14. The terminal apparatus according to claim 10, wherein the use status information comprises at least one second bitmap, each second bitmap of the at least one second bitmap corresponds to one respective subframe, bit fields in each second bitmap of the at least one second bitmap correspond to different to-be-measured resources in the respective subframe corresponding to the respective second bitmap, a value of each bit field in each second bitmap of the at least one second bitmap indicates a use status of a to-be-measured resource corresponding to the respective bit field, and a location of each bit field in each second bitmap of the at least one second bitmap indicates a location of a to-be-measured resource corresponding to the respective bit field.

15. The terminal apparatus according to claim 10, wherein the operations comprise:

receiving, by the terminal apparatus, the first measurement parameter sent by the network device.

16. The terminal apparatus according to claim 10, wherein the operations further comprise:

sending, by the terminal apparatus, the first measurement parameter to the network device.

17. The terminal apparatus according to claim 10, wherein the first resource set is a subset of a second resource set, and the second resource set comprises the first resource in the centralized scheduling resource pool, and the operations comprise:

dividing, by the terminal apparatus, a resource in the second resource set into at least one to-be-measured resource based on the first measurement parameter;

determining, by the terminal apparatus, a use status of each to-be-measured resource in the at least one to-be-measured resource corresponding to the second resource set, to obtain use status information of each resource in the second resource set; and determining, by the terminal apparatus, use status information of each resource in the first resource set from the use status information of each resource in the second resource set based on the configuration information.

18. A non-transitory computer-readable storage medium storing a program executable by at least one processor, the program including instructions for:

obtaining configuration information of a first resource set, wherein the first resource set comprises a first resource in a centralized scheduling resource pool, and the configuration information indicates a location of a second resource in the first resource set, and wherein the first resource and the second resources are same resources or different resources;

obtaining a first measurement parameter, wherein the first measurement parameter indicates a length of a to-be-measured resource;

dividing the second resource in the first resource set into at least one to-be-measured resource based on the first measurement parameter;

determining a use status of each to-be-measured resource in the at least one to-be-measured resource to obtain use status information; and sending the use status information to a network device.

19. The non-transitory computer-readable storage medium according to claim 18, wherein determining the use status of each to-be-measured resource in the at least one to-be-measured resource, to obtain use status information comprises:

obtaining a first level parameter, wherein the first level parameter indicates a priority of to-be-sent data of a terminal device;

obtaining a second level parameter, wherein the second level parameter indicates a priority carried in data received by the terminal device on a first to-be-measured resource of the at least one to-be-measured resource;

determining a measurement threshold based on the first level parameter and the second level parameter;

determining signal quality detected on the first to-be-measured resource; and determining a use status of the first to-be-measured resource based on the signal quality and the measurement threshold, to obtain use status information of the first to-be-measured resource.

20. The non-transitory computer-readable storage medium according to claim 19, wherein obtaining the first level parameter comprises:

receiving the first level parameter sent by the network device.

* * * * *